United States Patent
Bowles et al.

(10) Patent No.: US 10,938,428 B2
(45) Date of Patent: Mar. 2, 2021

(54) WIRELESS RECEIVER SYSTEM FOR NEUTRALIZING BLOCKING SIGNALS

(71) Applicant: HUAWEI TECHNOLOGIES CO., LTD., Guangdong (CN)

(72) Inventors: Gregory John Bowles, Nepean (CA); Tan Huy Ho, Stittsville (CA); Sai Mohan Kilambi, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/284,772

(22) Filed: Feb. 25, 2019

(65) Prior Publication Data
US 2020/0274563 A1    Aug. 27, 2020

(51) Int. Cl.
*H04B 1/10*    (2006.01)
*H04B 1/12*    (2006.01)

(52) U.S. Cl.
CPC ........... *H04B 1/109* (2013.01); *H04B 1/123* (2013.01); *H04B 2001/1045* (2013.01); *H04B 2001/1063* (2013.01); *H04B 2001/1072* (2013.01)

(58) Field of Classification Search
CPC ............... H04B 1/109; H04B 1/123; H04B 2001/1045; H04B 2001/1063; H04B 2001/1072
See application file for complete search history.

(56) References Cited

U.S. PATENT DOCUMENTS

| 8,934,583 | B1 | 1/2015 | Qi et al. |
| 2007/0264943 | A1* | 11/2007 | Darabi ............. H04B 1/123 455/88 |
| 2008/0107217 | A1 | 5/2008 | Vrcelj et al. |

(Continued)

FOREIGN PATENT DOCUMENTS

| CN | 108352847 A | 7/2018 |
| EP | 2408117 A1 | 1/2012 |
| WO | 2009156480 A1 | 12/2009 |

OTHER PUBLICATIONS

Varun D. et al. "Mixer Architecture with Improved Image Rejection and Interference Mitigation for Cognitive Radio", IEEE 2016. total 5 pages.

(Continued)

*Primary Examiner* — Nguyen T Vo
(74) *Attorney, Agent, or Firm* — BCF LLP (57) ABSTRACT

The disclosed systems and methods are directed to wireless receiver systems for neutralizing the effects of received RF blocking signals. The configurations presented herein operate to receive RF signals containing a desired signal and a blocking signal, a first module, in communication with the receive RF signals along a first signal path and configured to extract a specimen of the received desired and blocking signals, and a second module, in communication with the first module along a second signal path to receive the desired signal and blocking signal specimens. The second module is configured to produce a replica of the blocking signal based on the blocking signal specimen, generate an anti-blocking signal based on the blocking signal replica, and introduce the anti-blocking signal to the received desired and blocking signals in which the anti-blocking signal destructively interferes to neutralize the received blocking signal.

16 Claims, 9 Drawing Sheets

(56) References Cited

U.S. PATENT DOCUMENTS

| | | | |
|---|---|---|---|
| 2011/0171922 A1* | 7/2011 | Kim | H04B 1/525 455/307 |
| 2014/0003561 A1 | 1/2014 | Ranson et al. | |
| 2015/0050904 A1* | 2/2015 | Egri | H04B 1/123 455/303 |
| 2015/0207531 A1* | 7/2015 | Vahid Far | H03F 1/56 455/304 |
| 2018/0048339 A1 | 2/2018 | Wu et al. | |
| 2018/0254787 A1 | 9/2018 | Goodson et al. | |

OTHER PUBLICATIONS

Henderson et al., Image-Reject and Single-Sideband Mixers, The Communications Edge, 2001, WJ Communications, Inc., San Jose, USA.

Lyons R., "A Quadrature Signals Tutorial: Complex, But Not Complicated", Apr. 2013.

Universtity of California-Santa Barabara, Lecture Notes-Mixer Notes 2: quadrature and image reject mixing, ECE145B/218B course material (Winter 2011), retrieved from the link https://www.ece.ucsb.edu/~long/ece145b/quad_mixing.pdf listed in the web page https://www.ece.ucsb.edu/~long/ece145b/.

Kadambi et al., "Mixer Architecture with Improved Image Rejection and Interference Mitigation for Cognitive Radio", IEEE 2016.

International Search Report and Written Opinion of PCT/CN2020/076090; Zhenxing Dong; dated May 20, 2020.

* cited by examiner

WIRELESS RECEIVER SYSTEM FOR NEUTRALIZING BLOCKING SIGNALS

CROSS-REFERENCE TO RELATED APPLICATIONS

This is the first application filed for the instantly disclosed technology.

FIELD OF THE INVENTION

The present invention generally relates to the field of wireless communications and, in particular, to a wireless communication receiver system configured to neutralize blocking signals and the effects resulting therefrom.

BACKGROUND

Wireless communication receiver systems readily receive random signals in addition to the desired signals of interest. In some instances, the received random signals are either of small magnitude or significantly out of the receiver's designed frequency band. The receiver can adequately filter out random signals of this nature without interfering with the processing the desired signals.

However, in other instances, these random signals either occur proximate in frequency to the desired signals and/or have magnitudes that are sufficiently large so as to interfere with the processing of the desired signal. In some cases, a random signal has a significantly larger signal magnitude than the desired signals. In such cases, these random signals interfere with the proper functioning of receiver components. This may result in overall receiver desensitization or receiver "blocking." Stated differently, the properties of such interfering signals (e.g., frequency location, magnitude, phase, etc.) often exceed the designed—for tolerances of the receiver chain components. As such, these interfering signals have the potential of impairing receiver sensitivity by blocking the proper operations of the receiver components.

One example of such receiver blocking effects occurs when an interfering signal triggers the receiver's active gain control (AGC) system to reduce the overall gain, which increases the receiver's noise figure (NF) and reduces receiver sensitivity. Another example occurs when the interfering signal saturates one of the receiver's low noise amplifiers (LNAs) causing a decrease in gain, an increase receiver distortions, and an increase in the NF.

SUMMARY

An object of the present disclosure is to provide a wireless receiver system that effectively neutralizes the effects of received undesired RF blocking signals. In accordance with this objective, an aspect of the present disclosure provides a wireless receiver system operative to receive RF signals that contain a desired signal and a blocking signal. A first module, in communication with RF signals along a first signal path is configured to extract a specimen of the received desired and blocking signals. A second module, in communication with the first module along a second signal path to receive the desired signal and blocking signal specimens is configured to produce a replica of the blocking signal based on the blocking signal specimen, generate an anti-blocking signal based on the blocking signal replica, and introduce the anti-blocking signal to the received desired and blocking signals. As such, the anti-blocking signal destructively interferes with the received blocking signal and effectively neutralizes its effects.

In accordance with additional aspects of the present disclosure, there is provided a method neutralizing wireless blocking signals. The method includes receiving radio-frequency (RF) signals including a desired signal and a blocking signal and extracting a specimen of the received desired and blocking signals by a first module. The method further includes producing a replica of the blocking signal based on the blocking signal specimen by a second module, generating an anti-blocking signal based on the blocking signal replica by the second module, and introducing, by the second module, the anti-blocking signal to the received desired and blocking signals. In so doing, the anti-blocking signal destructively interferes with the received blocking signal and effectively neutralizes its effects.

BRIEF DESCRIPTION OF THE FIGURES

The features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

As used herein, the term "about" or "approximately" refers to a +/−10% variation from the nominal value. It is to be understood that such a variation is always included in a given value provided herein, whether or not it is specifically referred to.

Unless otherwise defined, all technical and scientific terms used herein have the same meaning as commonly understood by one of ordinary skill in the art to which the described embodiments appertain.

It is to be noted that the information conveyed above is specifically intended to provide a contextual reference that is believed to be of possible relevance to the ensuing disclosed embodiments. No admission is intended nor should it be construed that any of the preceding information constitutes prior art against the concepts and principles manifested by the embodiments described by the present disclosure.

Figure 1A:
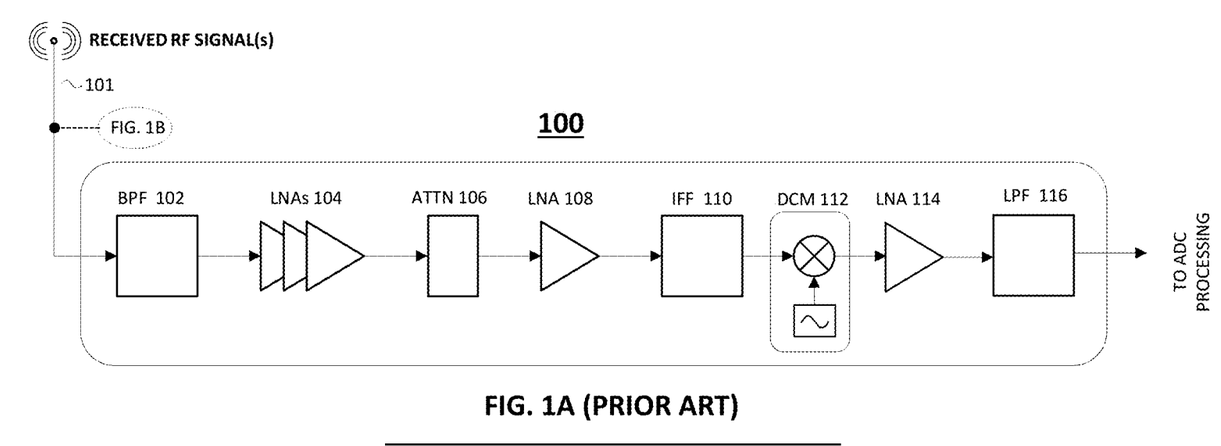
FIG. 1A (Prior Art) depicts a high-level functional block diagram of a basic conventional radio-frequency (RF) receiver system.

FIG. 1A (Prior Art) illustrates a high-level functional block diagram of a conventional radio-frequency (RF) receiver system 100. As shown, RF receiver system 100 incorporates several fundamental components along the analog receiver chain that are configured to process received RF signal(s) of interest. Such components may include, for example, antenna element(s) 101, initial stage bandpass filter (BPF) 102, one or more initial stage low-noise amplifiers (LNAs) 104, attenuator 106, intermediate stage LNA 108, intermediate stage BPF 110, down-converting mixer (DCM) 112, final stage LNA 114, and low-pass filter (LPF) 116.

RF receiver system 100 receives RF signal(s) via antenna element(s) 101 disposed at the front end of the receiver chain. The received RF signal(s) are fed to initial stage BPF 102 having a center frequency aligned with the desired RF frequency of interest and a bandwidth that filters out signals outside the operational range of interest.

The filtered RF signal(s) are then fed to one or more initial stage LNAs 104 to amplify the filtered RF signal(s). The signals amplified by LNA 104 are then supplied to attenuator 106 for magnitude adjustments/corrections.

The magnitude-adjusted RF signal(s) output by ATTN 106 are then further amplified by intermediate stage LNA 108 and filtered by intermediate stage filter 110, which are configured to improve RF signal(s) characteristics. The RF signal(s) output by IFF 110 are then supplied to DCM 112, which operates to down-convert the signal(s) to a baseband frequency range. These down converted signals are referred to as baseband signals.

The baseband signal(s) are then amplified by final stage LNA 114 to provide for proper signal amplification and final stage LPF 116 for anti-aliasing purposes. The amplified and filtered baseband signal(s) are subsequently supplied to an analog-to-digital conversion (ADC) unit to convert the baseband signal(s) into digital composite signal(s) suitable for digital signal processing.

However, as discussed above, the signal(s) received by RF receiver system 100 may include both the desired RF signal(s) and blocking signal(s). By way of a non-limiting example, FIG. 1B graphically illustrates a spectral view of a representative scenario in which RF receiver system 100 receives a desired RF signal DS along with interfering RF blocking signal IB. The desired signal DS is 100 MHz wide and, for tractability purposes, is represented as two constituent continuous-wave (CW) tones S1, S2 approximately −50 dBm in magnitude at frequency locations of 3.450 GHz and 3.550 GHz, respectively.

Figure 1B:
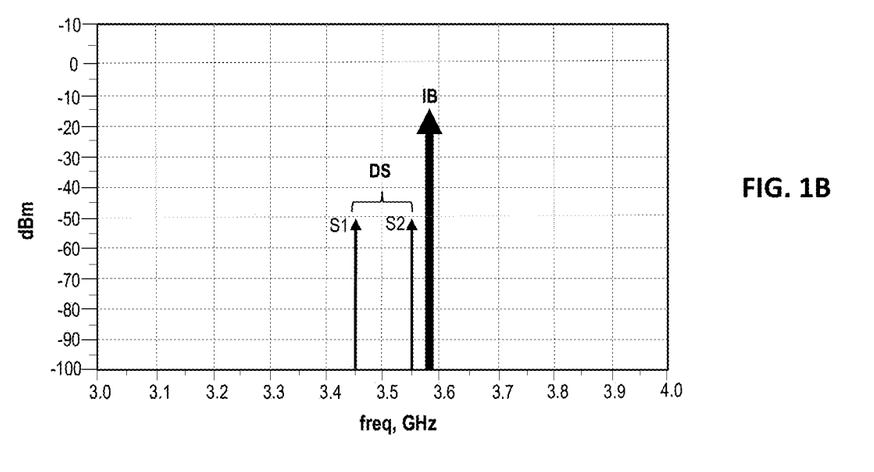
FIG. 1B graphically illustrates spectral attributes of a representative received desired RF signal and a representative blocking signal.

In turn, blocking signal IB is characterized as a single CW tone having a magnitude of approximately −15 dBm at frequency location 3.570 GHz. In the representative scenario, blocking signal IB is substantially close to the frequency band of interest (e.g., 20 MHz apart from constituent signal S2) and is approximately 35 dBm higher in power than the desired RF signal DS (i.e., constituent signals S1, S2).

It will be appreciated that the noted spectral properties of desired signal DS (i.e., constituent signals S1, S2) and blocking signal IB are directed to providing representative examples of received RF signals for purposes of illustration only and, are not in any way, intended to be limiting. For example, the principles and concepts described herein apply equally to modulated received RF signals that may have different frequencies and different magnitudes than the properties noted above. It should also be understood that DS and IB can be understood to be the signals that survive BBF 102 and LNA 104.

Given the representative attributes of blocking signal IB (e.g., magnitude and frequency location), there exists the likelihood that signal IB will exceed the tolerances of receiver's 100 chain components, which are typically designed to handle and process the expected properties of desired signal DS. The affected components may include LNAs 104, 108, 114, DCM 112, automatic gain control (AGC) (not shown), etc. As such, blocking signal IB has the potential of impairing receiver sensitivity by blocking the proper operations of these receiver components.

Figure 2A:
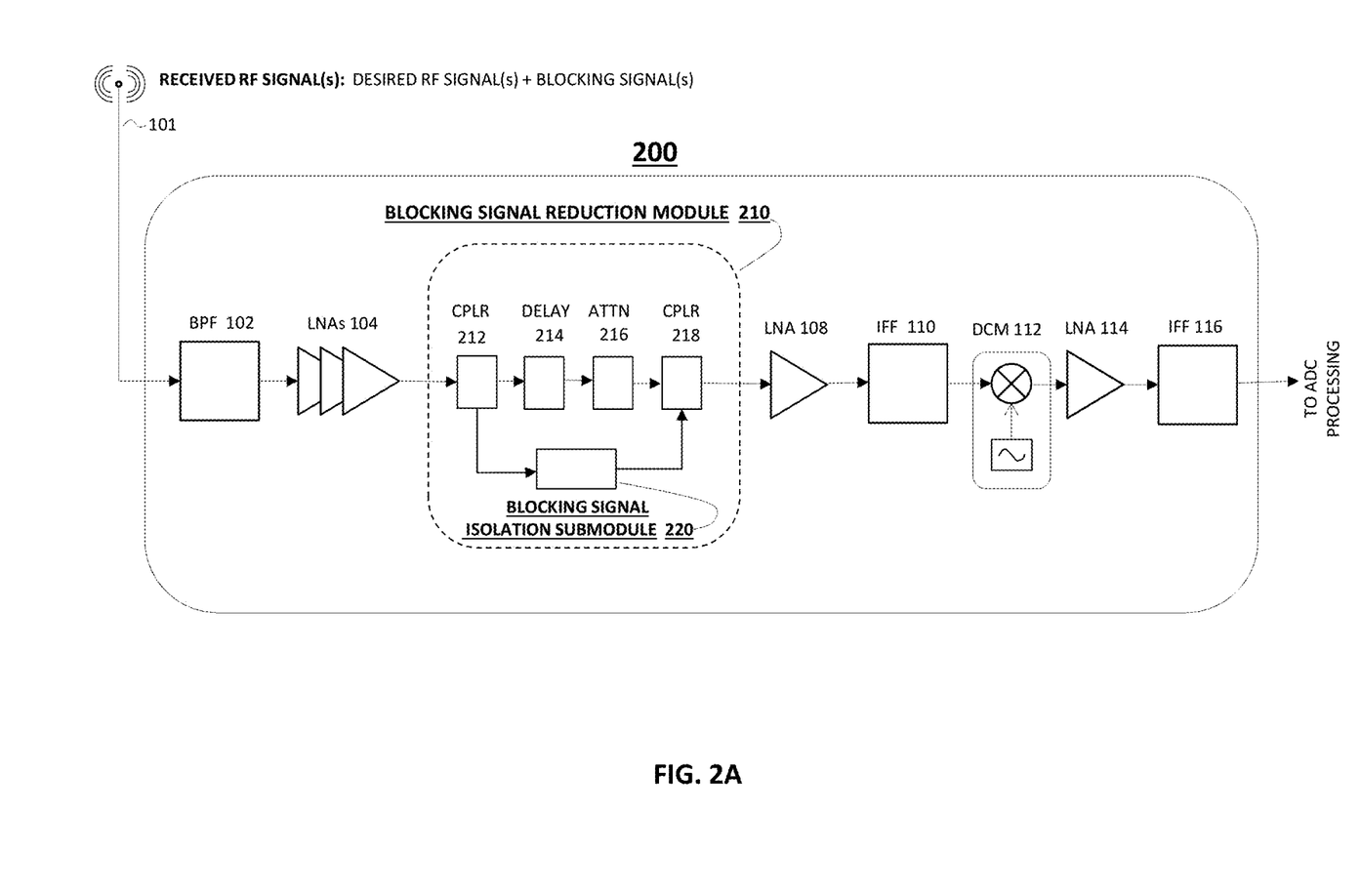
FIG. 2A depicts a high-level functional block diagram of an RF receiver employing a blocking signal reduction module, in accordance with various embodiments of the present disclosure.

FIG. 2A depicts a high-level functional block diagram illustrating the system of RF receiver 200 operative to neutralize the effects of blocking signal(s), in accordance with various embodiments of the present disclosure. Receiver 200 implements a blocking signal reduction module 210 that may be integrated within conventional receiver system 100. Blocking signal reduction module 210 includes components that are configured to produce a replica of blocking signal TB and, in turn, generate an "anti-blocking signal" A-IB that will be subsequently introduced into the main RF signal path of receiver 200 to neutralize the effects of blocking signal IB.

In particular, as shown in FIG. 2A, blocking signal reduction module 210 incorporates initial stage coupler CPLR 212, delay element 214, attenuation element ATTN 216, and final stage coupler CPLR 218, along the main RF signal path. Additionally, along a fed-forward parallel signal path, blocking signal reduction module 210 incorporates blocking signal isolation submodule 220.

As depicted in the illustrated embodiment, blocking signal reduction module 210 forwards the received RF signals, namely, desired signal DS (i.e., constituent signals S1, S2)

and blocking signal TB to the input port of initial stage coupler CPLR 212. CPLR 212 is configured to extract a small specimen (e.g., −20 dBm) of the received RF signals and direct the specimen signal to the fed-forward parallel signal path via its coupling port to blocking signal isolation submodule 220. By extracting a small specimen of the received RF signals, the output port of CPLR 212 minimizes any substantial signal-to-noise ratio (SNR) degradation of the desired DS and blocking TB signals along the main RF signal path.

Figure 3A:
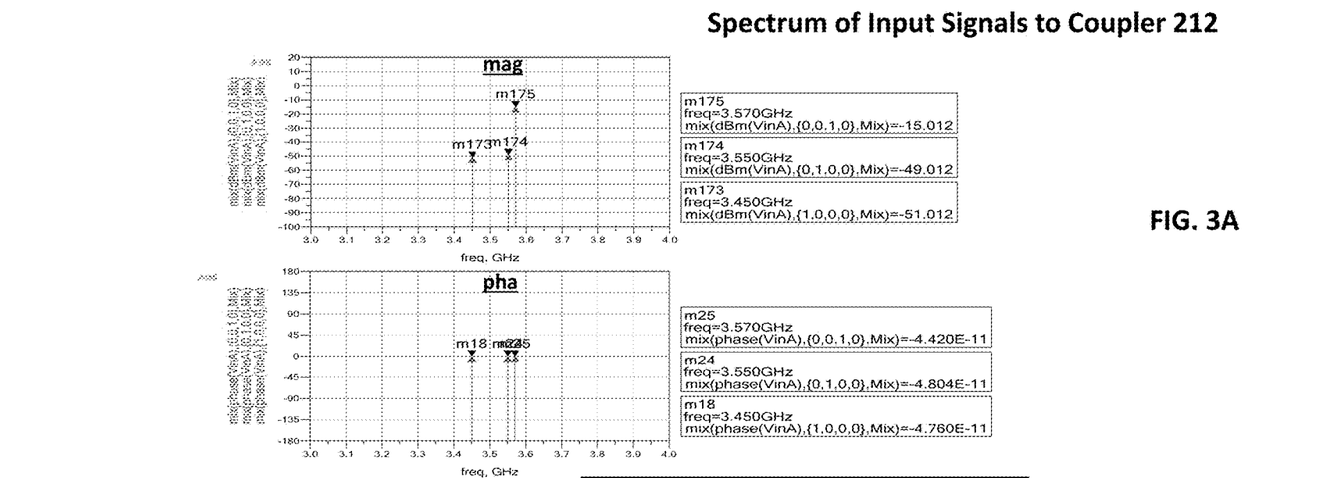
FIG. 3A graphically illustrates spectral attributes of the representative desired RF signal and blocking signal at the coupler input of blocking signal reduction module, in accordance with various embodiments of the present disclosure.

FIG. 3A graphically illustrates spectral attributes of the representative desired signal DS and blocking signal TB at the CPLR 212 input, in accordance with various embodiments of the present disclosure. As shown, desired signal DS (i.e., constituent signals S1, S2) exhibit magnitudes of approximately −50 dBm with approximately 0° phases at frequency locations of 3.450 GHz and 3.550 GHz, respectively. Moreover, blocking signal TB exhibits a magnitude of approximately −15 dBm with approximately a 0° phase at frequency location 3.570 GHz.

Returning to FIG. 2A, along the main RF signal path, initial coupler CPLR 212 forwards the minimally-reduced RF signals DS, TB to delay element 214. Delay element 214 is configured to shift the timing of the desired signal DS (i.e., constituent signals S1, S2) and TB to compensate for any timing differences between the signals and processing delays incurred by blocking signal isolation submodule 220. The delayed signals S1, S2, TB are then forwarded to attenuation element ATTN 216 that is configured to correct any magnitude variations of delayed signals S1, S2, IB. The delayed and magnitude corrected signals S1, S2, TB are then supplied to the input of final stage coupler CPLR 218.

Along the parallel RF signal path, the specimen signal that has been provided to blocking signal isolation submodule 220 contains operable content and characteristics of desired signal DS and blocking signal IB. As will be described in greater detail below, blocking signal isolation submodule 220 is configured to process the specimen signal to isolate the content of blocking signal TB and produce an anti-blocking signal A-IB based on the isolated content of blocking signal IB. This anti-blocking signal A-IB is provided to CPLR 218 to close a feed-forward loop.

In turn, blocking signal isolation submodule 220 will introduce anti-blocking signal A-IB to receiver system's 200 main RF signal path via final stage coupler CPLR 218. The coupled anti-blocking signal A-IB will operate to destructively combine with the original received RF blocking signal TB on the main RF signal path to substantially neutralize its blocking effects.

Figure 2B:
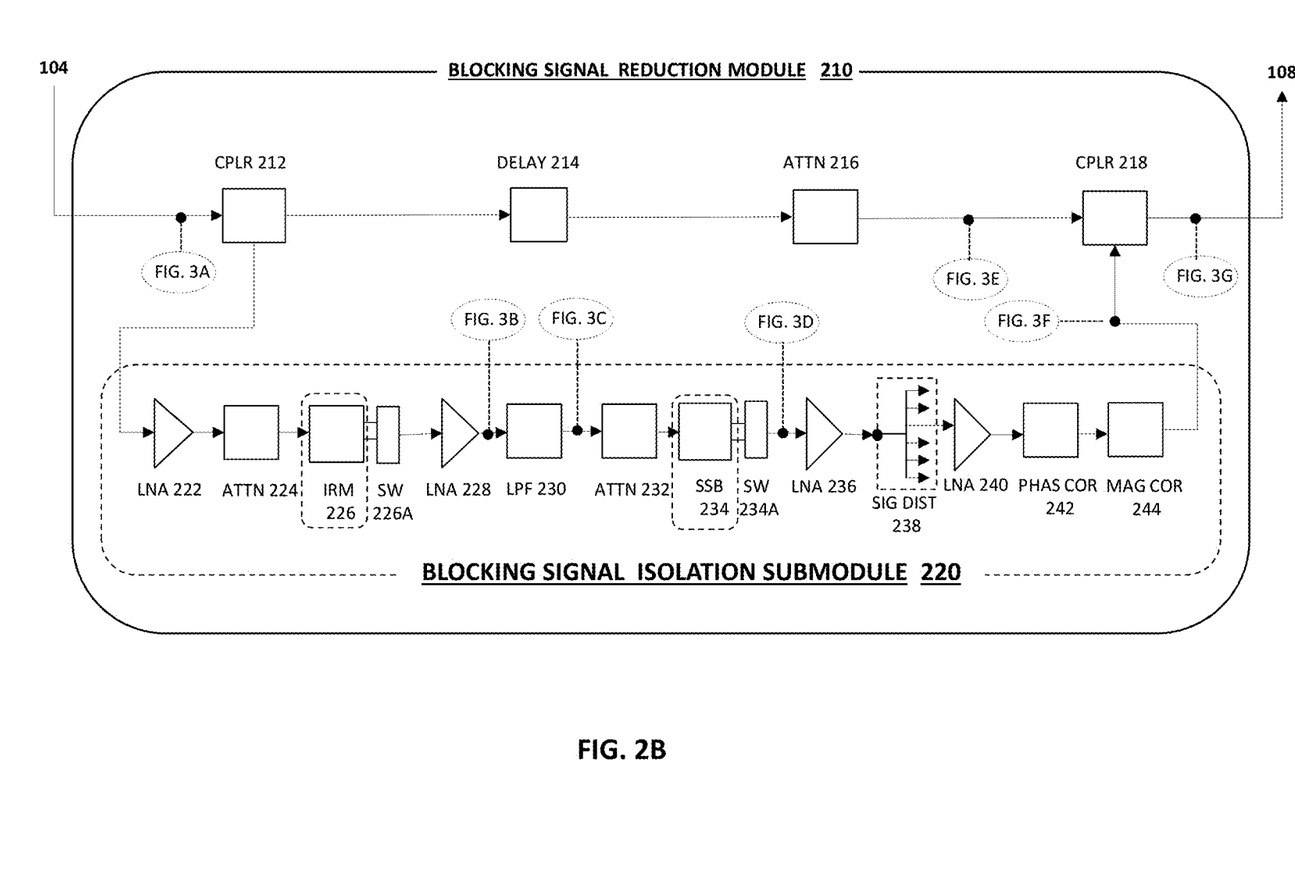
FIG. 2B depicts a detailed functional block diagram of a blocking signal isolation submodule, in accordance with various embodiments of the present disclosure.

FIG. 2B depicts a detailed functional block diagram of blocking signal isolation submodule 220, in accordance with various embodiments of the present disclosure. As shown, blocking signal isolation submodule 220 comprises LNA 222, attenuator ATTN 224, image rejection mixer IRM stage 226, LNA 228, low-pass filter LPF 230, attenuator ATTN 232, single sideband mixer stage SSB 234, LNA 236, optional signal distribution element 238, LNA 240, phase correction element 242, and magnitude correction element 244.

As noted above, the feed-forward specimen signal containing the content and characteristics of desired signal DS (i.e., constituent signals S1, S2) and blocking signal TB are introduced to blocking signal isolation submodule 220 through the parallel signal path via LNA 222 and attenuator ATTN 224. LNA 222 and attenuator ATTN 224 function to amplify and adjust the signal power of the specimen signal and provide sufficient drive levels for subsequent processing by submodule 220.

The specimen signal is then submitted to image rejection mixer IRM stage 226. IRM stage 226 is configured to down-convert the RF frequencies of the specimen signal and suppress the power of desired signal DS (i.e., magnitude of constituent signals S1, S2). This effectively isolates the blocking signal IB portion of the specimen signal and render an isolated blocking IB specimen signal.

Typically, IRM architectures incorporate various components, such as, for example, balanced mixers, in-phase local oscillator (LO) frequency drivers, quadrature couplers, in-phase dividers etc. that implement phasing techniques to down-convert the frequencies of desired signals while suppressing unwanted mixed frequency signal products. Accordingly, the LO frequency of IRM 226 should be set to operate between the frequencies of desired signal DS and blocking signal IB.

Therefore, in keeping with the spectral attributes of signals S1, S2, IB noted above for illustrative purposes only, the LO frequency of IRM 226 is set to operate at 3.560 GHz. This LO frequency resides between the noted desired signal DS edge (i.e., S2 at 3.550 GHz) and blocking signal IB (i.e., at 3.570 GHz).

Figure 3B:
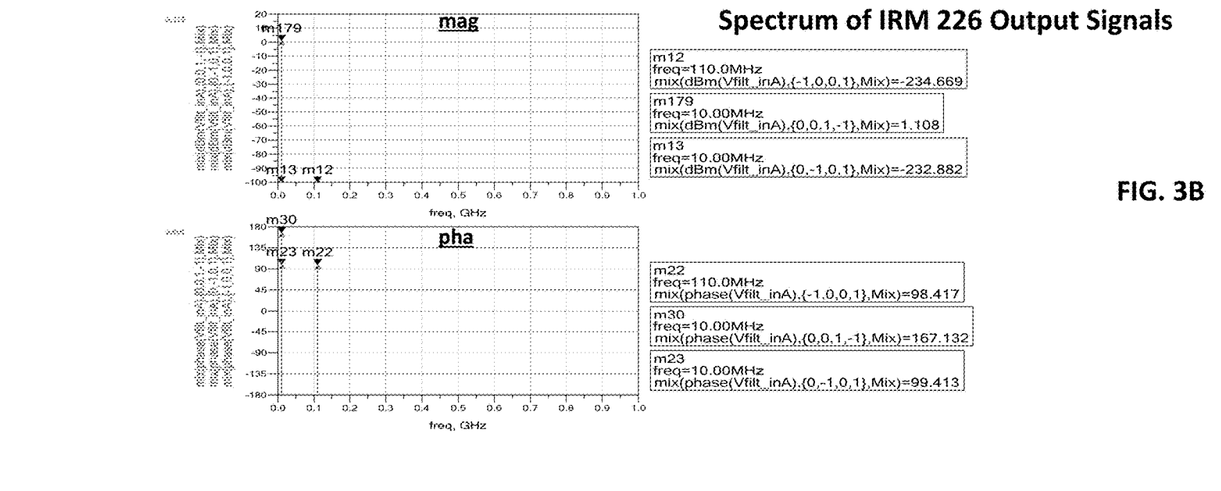
FIG. 3B graphically illustrates spectral attributes of representative image rejection mixer (IRM) output signals of the blocking signal isolation submodule, in accordance with various embodiments of the present disclosure.

FIG. 3B graphically illustrates spectral attributes of representative output signals of IRM 226, in accordance with various embodiments of the present disclosure. As shown, IRM 226 outputs signals that includes isolated blocking IB specimen signal, which has been down-converted to a frequency of approximately 0.01 GHz. In contrast, constituent signals S1, S2, which define the edges of desired signal DS, have been down-converted to frequencies of approximately 0.01 GHz and 0.10 GHz, respectively, with substantially reduced magnitudes. In so doing, IRM 226 effectively suppresses desired signal DS in order to render isolated blocking IB specimen signal for subsequent processing.

It is to be noted that, as discussed above, FIG. 1B depicts a representative scenario in which the originally-received blocking signal IB occurs at an RF frequency higher than desired signal DS (as represented by constituent signals S1, S2). And, for illustrative purposes, the disclosed embodiments have been described in accordance with the representative scenario. However, it will be appreciated that the received blocking signal IB may also appear at a lower frequency than desired signal DS. In practice, it may be difficult to determine in advance where blocking signal IB will occur relative to the desired signal DS frequency location.

Figure 2C:
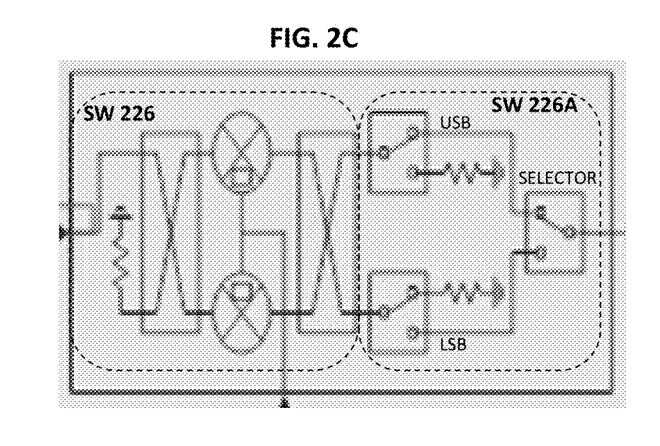
FIG. 2C depicts a functional block diagram of an image rejection mixer complete with an output switching module, in accordance with various embodiments of the present disclosure.

To this end, FIG. 2C depicts IRM output switching module 226A, in accordance with various embodiments of the present disclosure. IRM output switching module 226A may be configured to operate in conjunction with IRM 226 to provide the selection of upper sideband (USB) or lower sideband (LSB) signals to ensure the isolation of blocking signal IB.

Figure 2D:
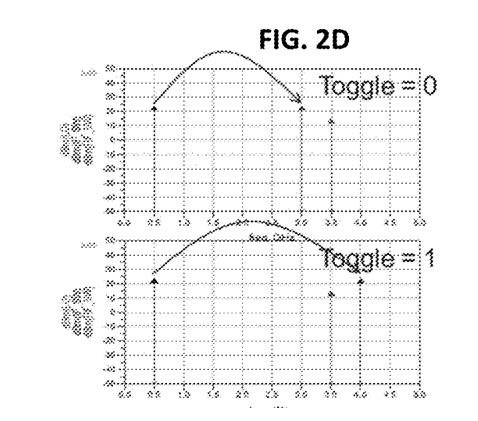
FIG. 2D illustrates exemplary output for the image rejection mixer under two switching states, in accordance with various embodiments of the present disclosure.

FIG. 2D illustrates exemplary switching states for the IRM output switching module 226A, in accordance with various embodiments of the present disclosure. For example, the depicted signal at 0.50 GHz is the IB signal and the depicted signal at 3.5 GHz is the local oscillator (LO). IRM output switching module 226A is configured to pick off either side of the spectrum depending on the switch or toggle control. That is, for "Toggle=0", only the low-side combination of LO-IF is visible (i.e., LO+IF and 4.0 GHz are ignored); and for "Toggle=1", only the high-side combination of LO+IF is visible (i.e., signal at LO-IF and 3 GHz are ignored).

Returning to FIG. 2B, the isolated blocking IB specimen signal output by IRM stage 226 is subjected to a conditioning process to adjust the drive levels prior to an up-conversion mixing stage. The conditioning process comprises amplification by LNA 228 to boost isolated blocking IB specimen signal, filtering by low-pass filter LPF 230 to exclude extraneous spurious signals across the bandwidth of interest, and power level adjustment by ATTN 232. LPF 230 may be configured to have a wide bandwidth, such as, for example, a bandwidth that excludes all signals beyond 1 GHz.

Figure 3C:
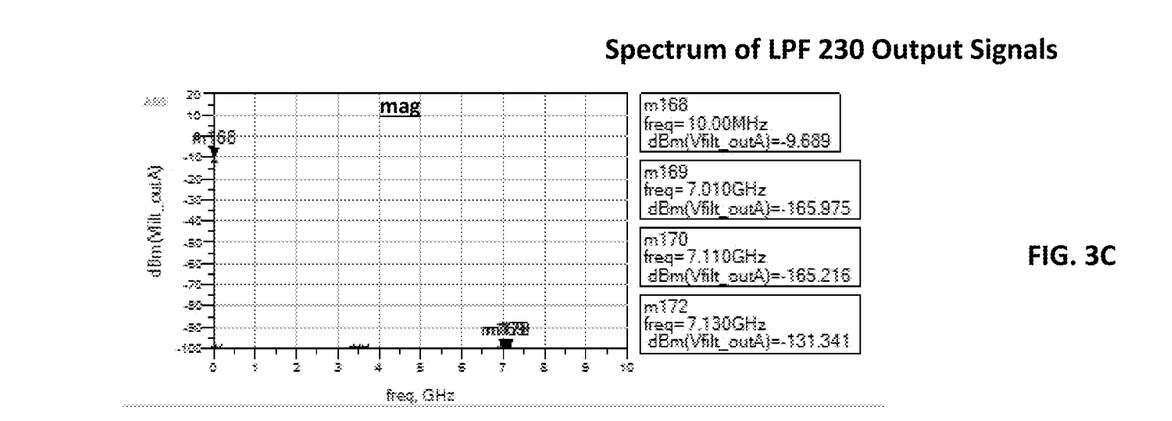
FIG. 3C graphically illustrates spectral attributes of representative low-pass filter (LPF) output signals of the blocking signal isolation submodule, in accordance with various embodiments of the present disclosure.

FIG. 3C graphically illustrates spectral attributes of representative output signals of LPF 230, in accordance with various embodiments of the present disclosure. As depicted, the conditioned isolated blocking IB specimen signal has a magnitude of approximately −10 dBm at 0.01 GHz while all other signals, including constituent desired signals S1, S2 are maintained at negligible values.

Returning to FIG. 2B, the conditioned isolated blocking IB specimen signal is subsequently forwarded to an up-conversion mixing stage comprising single sideband mixer SSB stage 234. SSB 234 operates to up-convert the frequency of the conditioned isolated blocking IB specimen signal to match the frequency location of the originally-received blocking signal IB.

It will be appreciated that SSB architectures employ similar components to their IRM counterparts, such as, for example, balanced mixers, in-phase local oscillator (LO) frequency drivers, quadrature couplers, in-phase dividers etc. In contrast to IRM structures, however, SSB components typically implement phasing techniques to up-convert the frequencies of certain signals while suppressing signals containing unwanted mixed frequency signal products. Therefore, in accordance with various embodiments of the present disclosure, the LO frequency of SSB 234 is configured to operate at substantially the same LO frequency employed by IRM 226

Figure 3D:
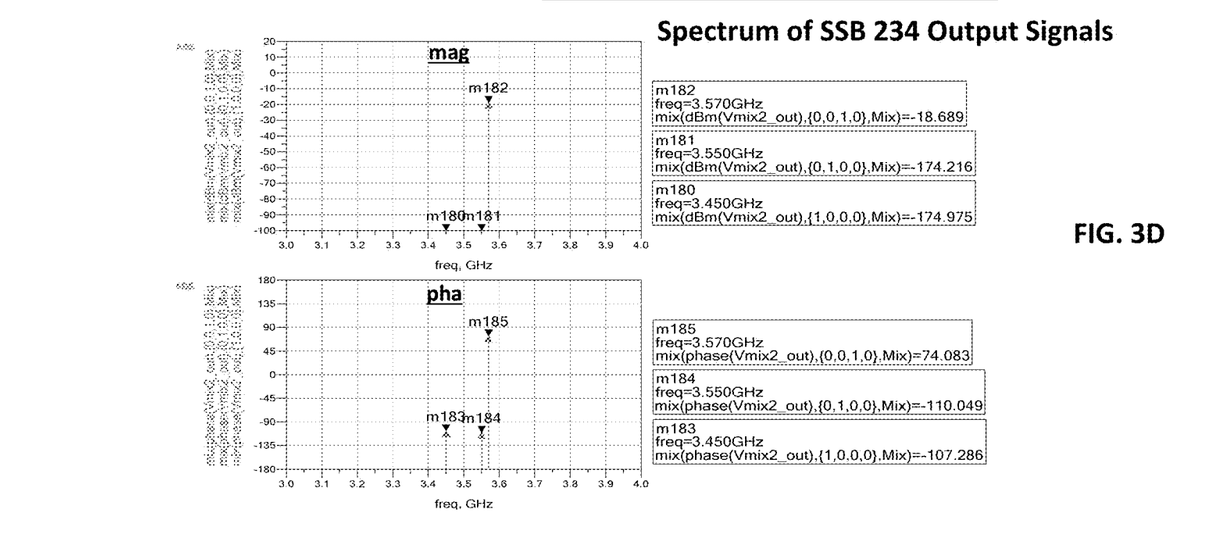
FIG. 3D graphically illustrates spectral attributes of representative single sideband mixer (SSB) output signals of the blocking signal isolation submodule, in accordance with various embodiments of the present disclosure.

FIG. 3D graphically illustrates spectral attributes of representative SSB 234 output signals, in accordance with various embodiments of the present disclosure. As shown, SSB stage 234 has effectively up-shifted the frequency of isolated blocking IB specimen signal to substantially match the original received blocking signal IB frequency location of 3.570 GHz with a magnitude of approximately −19 dBm while all other signals, namely, constituent signals S1, S2 remain at negligible levels. As such, SSB stage 234 processes isolated blocking IB specimen signal to embody characteristics of originally-received blocking signal IB.

It will be appreciated that, given the unpredictability of the blocking signal IB location, as discussed above relative to IRM stage 226, SSB stage 234 may operate with an SSB output switching module 234A, in accordance with embodiments of the present disclosure. SSB output switching module 234A can be configured to provide the selection between upper sideband (USB) or lower sideband (LSB) signals and may employ an architecture similar to IRM output switching module 226A, as depicted in FIG. 2C.

With this said, armed with isolated blocking IB specimen signal manifesting attributes of originally-received blocking signal IB, blocking signal isolation submodule 220 proceeds to generate an anti-blocking signal A-IB. The anti-blocking signal A-IB will be configured to substantially match the magnitude and frequency characteristics of the originally-received blocking signal IB while having an inverted phase value.

However, it will be appreciated that while the frequency characteristics of isolated blocking IB specimen signal remain substantially constant, other attributes, such as, for example, magnitude, phase, delays, etc. may vary due to electrical and physical properties of the signal path(s) and associated elements. Thus, submodule 220 incorporates components that adjust and align the signal properties of anti-blocking signal A-IB to inversely match the properties of originally-received blocking signal IB.

Figure 2E:
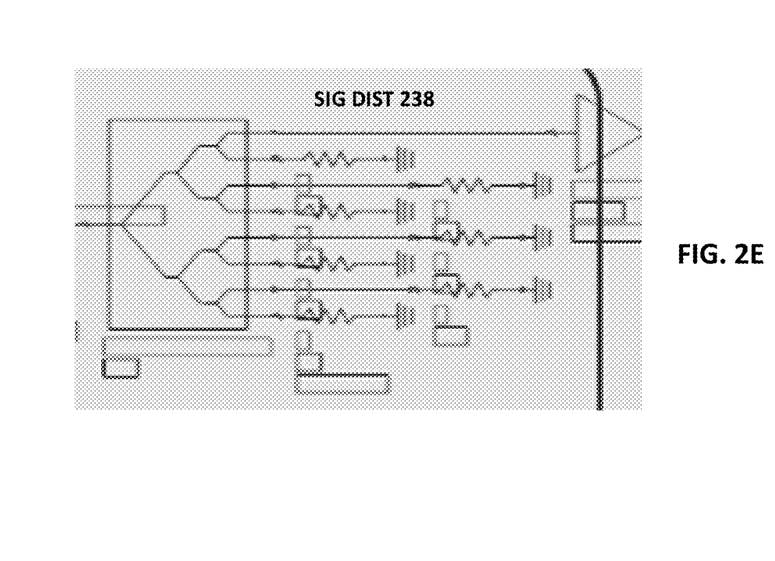
FIG. 2E depicts a representative signal distribution module, in accordance with various embodiments of the present disclosure.

As part of this process, the isolated blocking IB specimen signal output by SSB 234 is amplified by LNA 236 to maintain drive levels for subsequent processing. However, in some instances, it may be desirable to supply isolated blocking IB specimen signal to more than one receiver element within a multi-receiver system, such as, for example, MIMO and M-MIMO systems. FIG. 2E depicts signal distribution module 238, in accordance with certain embodiments of the present disclosure. Signal distribution module 238 is configured to provide isolated blocking IB specimen signal across multiple receiver paths by employing a switching mechanism that selects the receiver elements of interest. As shown in FIG. 2E, each receiver element path of signal distribution module 238 may respectively implement magnitude, phase, and delay components to compensate for such variances.

Turning back to FIG. 2B, submodule 220 further incorporates LNA 240, phase correction element 242, and magnitude correction element 244 to adjust and align the signal properties of isolated blocking IB specimen signal to complete anti-blocking signal A-IB. As noted above, anti-blocking signal A-IB is to be introduced to receiver system's 200 main RF signal path via final stage coupler CPLR 218. Therefore, in rendering anti-blocking signal A-IB, LNA 240 may be configured to amplify and provide a signal boost to isolated blocking IB specimen signal to compensate for the eventual coupling losses (e.g., −20 dBm) due to coupler CPLR 218.

The boosted isolated blocking IB specimen signal is then forwarded to phase correction element 242, which is configured to shift the phase of the replica IB signal by approximately −90° (or 270°), based on the received main path signal. This phase shift operates to inversely-match the phase of originally-received blocking signal IB, which is then processed by magnitude correction element 244 to adjust the magnitude level. The magnitude-adjusted, inverse-phase signal represents the opposite conjugate of the originally-received blocking signal, thereby establishing anti-blocking signal A-IB.

Figure 3E:
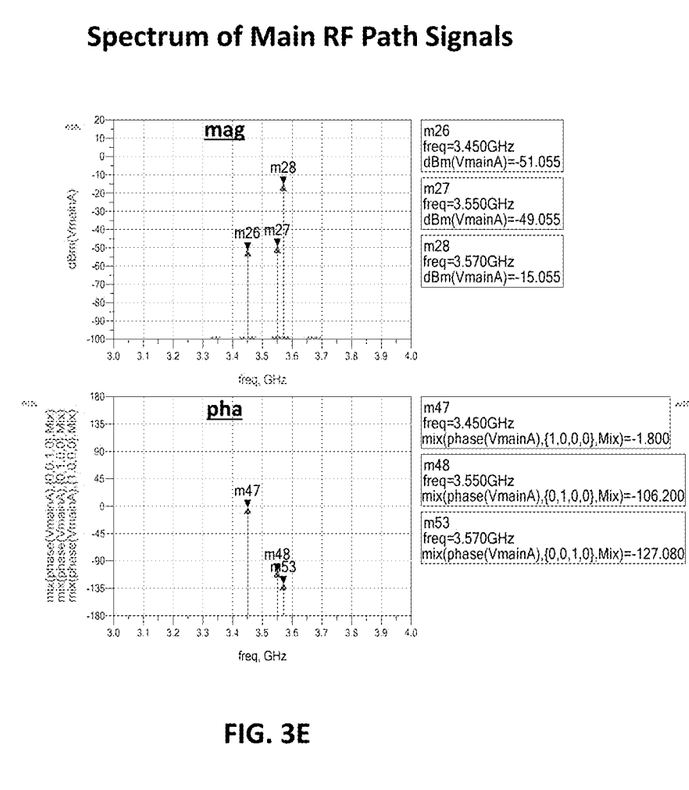
FIG. 3E graphically illustrates spectral attributes of representative main path signals of the blocking signal reduction module, in accordance with various embodiments of the present disclosure.

As a reminder, FIG. 3E depicts the spectral attributes of the processed main RF path signals prior to final stage coupler CPLR 218, that includes desired signal DS represented by constituent desired signals S1, S2 and the original blocking signal IB. It will be noted that original blocking signal TB exhibits a magnitude of approximately −15 dBm at frequency location 3.570 GHz with a phase of approximately −127°.

Figure 3F:
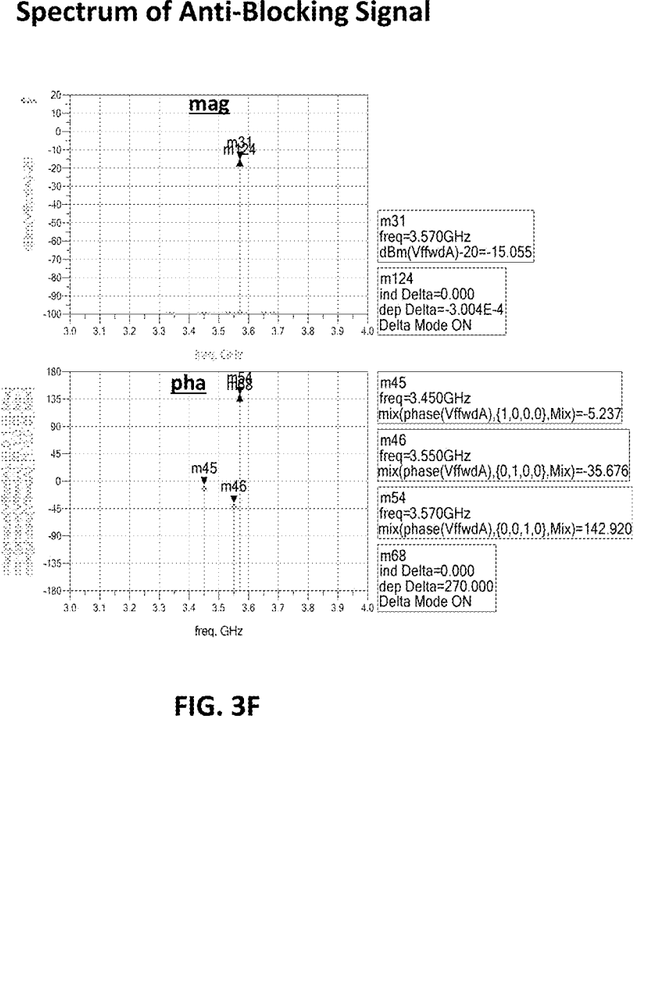
FIG. 3F graphically illustrates spectral attributes of a representative anti-blocking interference signal produced by blocking signal isolation submodule, in accordance with various embodiments of the present disclosure.

By way of comparison, FIG. 3F graphically illustrates an exemplary representation of the spectral attributes of anti-blocking signal A-IB provided by blocking signal isolation submodule 220 along the parallel signal path. As shown in this representation, anti-blocking signal A-IB substantially matches the magnitude of originally-received blocking signal TB of approximately −15 dBm. However, anti-blocking signal A-IB manifests a phase of approximately 143° that is about 270° (i.e., −90°) out of phase with the originally-received blocking signal TB phase of approximately −127°.

Anti-blocking signal A-IB is subsequently introduced to receiver system's 200 main RF signal path via final stage coupler CPLR 218. At this final coupling stage, the introduced anti-blocking signal A-IB is combined with the main RF path signals that include the received desired and blocking signals. Upon introduction, anti-blocking signal serves to destructively interfere with the originally-received blocking signal TB to neutralize its effects while leaving the received desired signal intact. CPLR 218 receives two inputs. The first, from the main path is largely comprised of DS +IB. The second, from the parallel path, is A-IB. The coupling of these inputs will mitigate the effects of TB by reducing the magnitude of TB by A-IB to effectively isolate DS.

Figure 3G:
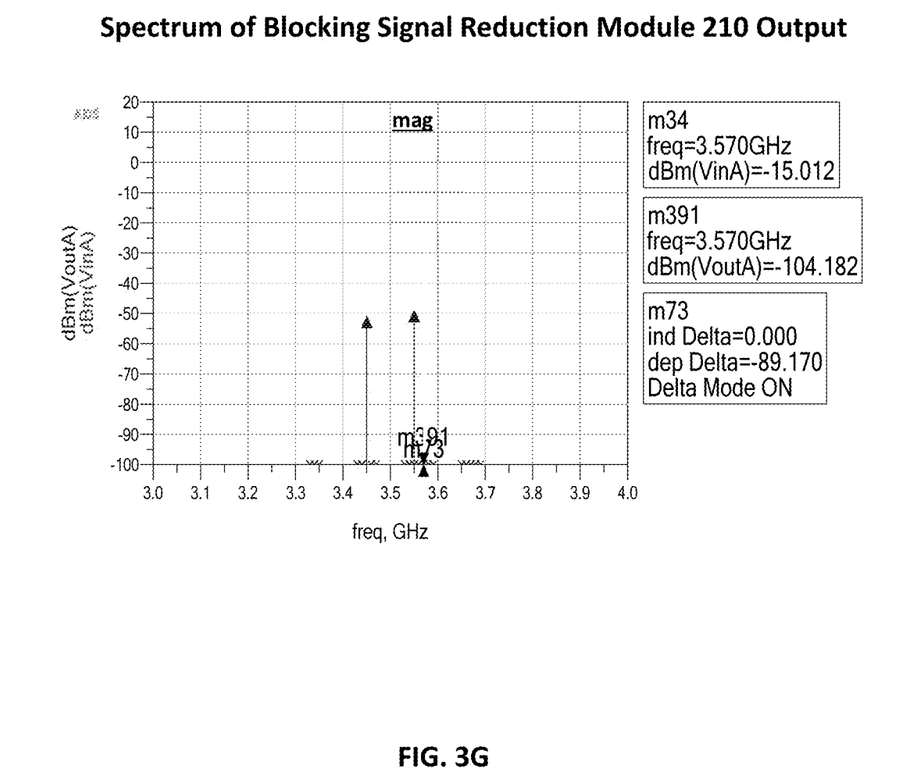
FIG. 3G graphically illustrates spectral attributes of representative output signals from blocking signal reduction module, in accordance with various embodiments of the present disclosure.

To this end, FIG. 3G graphically illustrates the spectral attributes of the signals that are output by blocking signal reduction module 210 after the final coupling stage, in accordance with various embodiments of the present disclosure. As shown, desired signal DS (i.e., constituent signals S1, S2) substantively maintains its original spectral characteristics, namely, magnitudes of approximately −50 dBm at frequency locations of 3.450 GHz and 3.550 GHz, thereby remaining unaffected. In contrast, originally-received blocking signal IB has been effectively neutralized.

Figure 4:
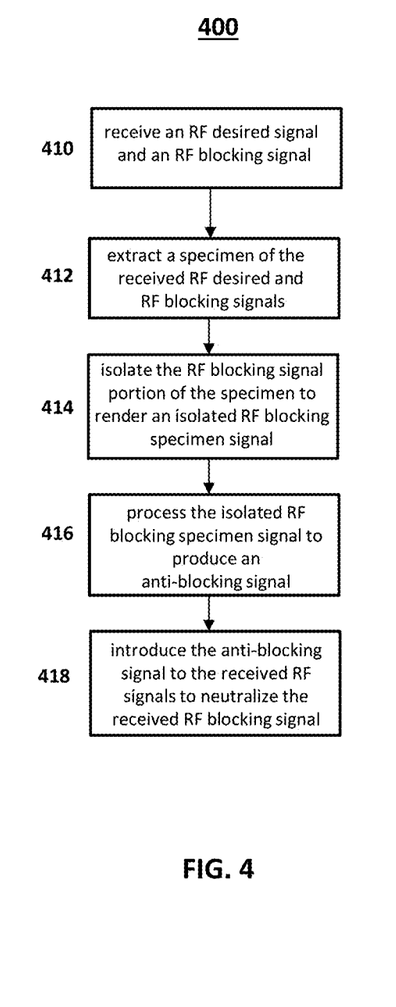
FIG. 4 depicts a functional flow diagram of a process for neutralizing blocking signals based on the described wireless receiver system, in accordance with various embodiments of the present disclosure.

FIG. 4 depicts a functional flow diagram of process 400 for neutralizing blocking signals in conjunction with the wireless receiver system 200 described above and in accordance with various embodiments of the present disclosure. As shown, process 400 begins at task block 410, in which wireless receiver system 200 receives a desired RF signal and an RF blocking signal. As noted above, system 200 includes antenna element(s) configured to receive desired RF signals that may also be subject to receipt of undesired RF blocking signals.

Process 400 proceeds to task block 412, where system 200 extracts a specimen of the received RF desired signal and RF blocking signal. As noted above, system 200 employs a coupling mechanism CPLR 212 that extracts a diluted specimen (e.g., −20 dBm) of the received RF desired and blocking signals.

At task block 414, system 200 operates to separate and isolate, from the extracted specimen, the blocking signal IB portion from the desired signal portion. As described, system 200 incorporates an image rejection filtering element IRM 226 to isolate the blocking signal IB portion of the specimen signal to render an isolated blocking IB specimen signal.

At task block 416, system 200 operates to process isolated blocking IB specimen signal to produce anti-blocking signal A-IB. As noted above, system 200 implements various elements to condition and adjust the attribute levels of isolated blocking IB specimen signal, which is then supplied to single sideband mixing element SSB 234 to up-convert the frequency of the conditioned isolated blocking IB specimen signal to match the frequency location of the originally-received blocking signal. The conditioned isolated blocking IB specimen signal is then forwarded to phase correction element 242, which is configured to translate the phase of the replica signal by approximately −90° (or 270°) to inversely-match the phase of the originally-received blocking signal. This inverse phase signal represents the opposite conjugate of the originally-received blocking signal to produce anti-blocking signal A-IB.

Finally, process 400 proceeds to task block 418, where system 200 introduces anti-blocking signal A-IB to the received desired and blocking signals which, in so doing, leaves the received desired signal intact while effectively neutralizing the received blocking signal. As previously described, system 200 implements a final stage coupling element CPLR 218 that introduces anti-blocking signal A-IB into the main RF signal path containing the received desired and blocking signals. Upon introduction, anti-blocking signal A-IB serves to destructively interfere with the originally-received blocking signal to neutralize its effects.

In this manner, the disclosed embodiments provide an RF receiver system that effectively neutralizes blocking signals while minimizing front-end gain losses and maintaining SNR sensitivity. The disclosed RF receiver system is capable of accounting for CW and modulated blocker occurrences and is adaptably scalable to support single and multiple MIMO/M-MIMO receiver elements.

It is to be understood that the operations and functionality of the disclosed RF receiver system and/or constituent components may be achieved by hardware-based, software-based, firmware-based elements and/or combinations thereof. Such operational alternatives do not, in any way, limit the scope of the present disclosure.

It will also be understood that, although the inventive concepts and principles presented herein have been described with reference to specific features, structures, and embodiments, it is clear that various modifications and combinations may be made without departing from the disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

What is claimed is:

1. A wireless receiver for neutralizing a blocking signal, comprising:
a first module operative to receive radio-frequency (RF) signals containing a desired signal and a blocking signal along a first signal path and configured to extract a minor sample portion of the magnitudes of the received desired and blocking signals to produce a specimen signal;
a second module, in communication with the first module along a second signal path, operative to receive the specimen signal and configured to:
isolate the blocking signal of the specimen signal by suppressing a magnitude of the desired signal included in the specimen signal and selecting a sideband frequency signal that corresponds to the blocking signal frequency location to produce an isolated blocking specimen signal,
generate an anti-blocking signal based on the isolated blocking specimen signal, and
introduce the anti-blocking signal to the received desired and blocking signals, wherein the anti-blocking signal destructively interferes to neutralize the received blocking signal.

2. The wireless receiver of claim 1, wherein the first module includes a first coupling element configured to extract the minor sample magnitude portion of the received desired and blocking signals to produce the specimen signal and to supply the specimen signal to the second module along the second signal path.

3. The wireless receiver of claim 1, wherein the second module includes an image rejection mixing element configured to down-convert frequency characteristics of the desired signal and blocking signal contained in the specimen signal and to minimize magnitude characteristics of the desired signal specimen.

4. The wireless receiver of claim 1, wherein the second module includes a single sideband mixing element configured to up-convert frequency characteristics of the blocking signal specimen to match the frequency location of the received blocking signal to produce the isolated blocking specimen signal.

5. The wireless receiver of claim 4, wherein the isolated blocking specimen signal comprises approximately same magnitude after accounting for coupling-related losses, frequency, and phase characteristics as the received blocking signal.

6. The wireless receiver of claim 5, wherein the second module includes a phase correcting element to shift phase characteristic of a blocking signal replica by −90° (270°) and a magnitude correcting element adjust signal levels to generate the anti-blocking signal.

7. The wireless receiver of claim 1, wherein the second module includes a second coupling element to introduce the anti-blocking signal to the received desired and blocking signals along the first signal path.

8. The wireless receiver of claim 1, wherein the second module includes an image rejection mixing element and/or a single sideband mixing element that incorporate a switching element to provide the selecting of upper sideband frequency signals and/or lower sideband frequency signals corresponding to the blocking signal frequency location.

9. A method for neutralizing a wireless blocking signal, comprising:
receiving radio-frequency (RF) signals including a desired signal and a blocking signal;
extracting a minor sample portion of the magnitudes of the received desired and blocking signals by a first processing module to produce a specimen signal;
isolating the blocking signal from the specimen signal by suppressing a magnitude of the desired signal included in the specimen signal and selecting a sideband frequency signal that corresponds to the block signal frequency location to produce an isolated blocking specimen signal by a second processing module;
generating an anti-blocking signal based on the isolated blocking specimen signal by the second processing module, and
introducing, by the second module, the anti-blocking signal to the received desired and blocking signals, wherein the anti-blocking signal destructively interferes to neutralize the received blocking signal.

10. The method of claim 9, wherein the extracting of the desired signal and blocking signal specimens includes a first coupling operation for deriving the specimens of the received desired and blocking signals to produce the specimen signal and for supplying the specimen signal to the second module along a second signal path.

11. The method of claim 9, wherein the isolating of the blocking signal specimen by the second module includes an image rejection mixing operation for down-converting frequency characteristics of the desired signal and blocking signal contained in the specimen signal and to minimize magnitude characteristics of the desired signal specimen.

12. The method of claim 9, wherein the producing of the isolated blocking specimen signal by the second module includes a single sideband mixing operation for up-converting frequency characteristics of the blocking signal specimen to match the frequency location of the received blocking signal and produce the isolated blocking specimen signal.

13. The method of claim 12, wherein the isolated blocking specimen signal comprises approximately same magnitude after accounting for coupling-related losses, frequency, and phase characteristics as the received blocking signal.

14. The method of claim 9, wherein the generating of the anti-blocking signal by the second module includes a phase correcting operation for shifting a phase characteristic of the blocking signal replica by −90° (270°) and a magnitude correcting operation for adjusting signal levels.

15. The method of claim 9, wherein the introducing of the anti-blocking signal to the received desired and blocking signals includes a second coupling operation for forwarding the anti-blocking signal to the first module.

16. The method of claim 9, wherein the second module further performs an image rejection mixing operation and/or a single sideband mixing operation that execute a switching operation for the selecting of upper sideband frequency signals and/or lower sideband frequency signals corresponding to the blocking signal frequency location.

* * * * *